United States Patent
Rini et al.

(10) Patent No.: US 7,316,262 B1
(45) Date of Patent: Jan. 8, 2008

(54) METHOD AND APPARATUS FOR ABSORBING THERMAL ENERGY

(75) Inventors: Daniel P. Rini, Orlando, FL (US); Louis Chow, Orlando, FL (US)

(73) Assignee: Rini Technologies, Inc., Oviedo, FL (US)

( * ) Notice: Subject to any disclaimer, the term of this patent is extended or adjusted under 35 U.S.C. 154(b) by 0 days.

(21) Appl. No.: 11/043,585

(22) Filed: Jan. 26, 2005

Related U.S. Application Data

(60) Provisional application No. 60/539,153, filed on Jan. 26, 2004.

(51) Int. Cl.
*F28D 17/04* (2006.01)

(52) U.S. Cl. .............. 165/10; 165/80.4; 165/104.17; 165/902

(58) Field of Classification Search .......... 165/10, 165/80.2, 80.4, 80.5, 104.17, 104.21, 104.33, 165/902
See application file for complete search history.

(56) References Cited

U.S. PATENT DOCUMENTS

| | | | |
|---|---|---|---|
| 5,412,536 A * | 5/1995 | Anderson et al. ...... 165/104.26 |
| 6,033,506 A | 3/2000 | Klett | |
| 6,037,032 A * | 3/2000 | Klett et al. .................. 428/71 |
| 6,354,370 B1 * | 3/2002 | Miller et al. ................ 165/263 |
| 6,399,149 B1 | 6/2002 | Klett et al. | |
| 6,500,401 B2 | 12/2002 | Reznek et al. | |
| 6,576,168 B2 | 6/2003 | Hardcastle et al. | |
| 6,631,755 B1 * | 10/2003 | Kung et al. ............ 165/104.33 |
| 6,656,238 B1 | 12/2003 | Rogers et al. | |
| 6,656,239 B1 | 12/2003 | Rogers et al. | |
| 6,656,443 B2 | 12/2003 | Klett | |
| 6,663,842 B2 | 12/2003 | Klett | |
| 6,673,328 B1 | 1/2004 | Klett et al. | |
| 6,675,872 B2 * | 1/2004 | Lewis et al. .................. 165/10 |
| 2002/0033247 A1 * | 3/2002 | Neuschutz et al. ........... 165/10 |
| 2002/0144811 A1 * | 10/2002 | Chou et al. .................. 165/236 |

* cited by examiner

*Primary Examiner*—Teresa J. Walberg
(74) *Attorney, Agent, or Firm*—Saliwanchik, Lloyd & Saliwanchik

(57) ABSTRACT

The subject invention pertains to a method and apparatus for storing thermal energy. The subject thermal energy storage apparatus can function as a heat absorber in a cooling system. A cooling system can incorporate a cooling cycle that utilizes thermal energy storage and has two coolant loops. The primary cooling loop acquires the waste heat from a heat source, such as an electronic device, by heat transfer to the primary coolant via, for example, a sensible heat process (where sensible heat is heat absorbed or transmitted by a substance during a change in temperature which is not accompanied by a change of state) or by evaporating the primary coolant through a latent heat phase change process. The waste heat absorbed by the primary coolant is transferred to the host material of the heat absorber. The subject invention uses a high thermal conductivity host material to house a lower thermal conductivity phase change material, in order to achieve a thermal energy absorber that has a high effective thermal conductivity. In a specific embodiment, the high thermal conductivity host material has have voids within the structure that can be filled by the phase change material. The increased surface area of phase change material in thermal contact with the host material per volume of phase change material allows the thermal energy to be stored or released quickly, because of the enhanced effective thermal conductivity.

40 Claims, 8 Drawing Sheets

ISOMETRIC VIEW

FRONT VIEW

METHOD AND APPARATUS FOR ABSORBING THERMAL ENERGY

CROSS-REFERENCE TO RELATED APPLICATION(S)

The present application claims benefit of U.S. Provisional Application Ser. No. 60/539,153, filed Jan. 26, 2004, which is hereby incorporated by reference herein in its entirety, including any figures, tables, or drawings.

FIELD OF THE INVENTION

The subject invention pertains to a method an apparatus for storing thermal energy. The subject invention also relates to a method and apparatus for absorbing thermal energy from a heat source. In a specific embodiment, the subject thermal energy storage apparatus can function as a heat absorber in a cooling system.

BACKGROUND OF THE INVENTION

Many heat absorption and/or heat storage applications have high heat loads, require precise temperature control, and/or have limited heat rejection options. Such applications include, but are not limited to, cooling microelectronics such as computer processors, cooling power conditioning equipment for prime power generation, cooling high-power laser diodes, cooling solid-state laser systems, cooling high power micro-wave systems, and cooling electronics in spacecraft applications.

Thermal energy storage devices typically include a housing, which encases a bulk volume of phase change material. Heat is conductively transferred from the heat source through the housing structure and begins to melt the phase change material, effectively storing the waste heat. Paraffin's are often selected as the phase change material in thermal energy storage devices because of their wide range of melting temperatures (−30° C. to 110° C.) and their high latent heat characteristics (150-250 kJ/kg). The disadvantage of most phase change materials is that these materials typically have a low thermal conductivity (k), especially in the liquid phase. Typical thermal conductivities are less than 0.2 W/m-K. This can result in large temperature gradients in the device being cooled in order to melt the entire volume of phase change material contained in the thermal energy storage device. In a typical phase change process a melting front is seen during the heat transfer process. The front is a dividing line between the melted material and the non-melted material. Heat is conducted across this front in order to melt the solid phase of the phase change material.

Some semiconductor devices, such as laser diodes, require the temperature control to be within ±2° C. and cannot tolerate large temperature increases during operation. In fact, with respect to this problem, the phase change material thermal conductivity is typically about 2-3 orders of magnitude too low. Due to the low thermal conductivity associated with these types of thermal energy storage devices these systems are limited in the rate at which they can absorb heat.

BRIEF DESCRIPTION OF INVENTION

The subject invention pertains to a method and apparatus for storing thermal energy. The subject invention also relates to a method and apparatus for absorbing thermal energy from a heat source. The subject invention also relates to a method and apparatus for enhancing the thermal performance of a thermal energy storage device that absorbs thermal energy from a heat source. The subject invention uses a high thermal conductivity host material to house a lower thermal conductivity phase change material, in order to achieve a thermal energy absorber that has a high effective thermal conductivity. In a specific embodiment, the high thermal conductivity host material has have voids within the structure that can be filled by the phase change material. The increased surface area of phase change material in thermal contact with the host material per volume of phase change material allows the thermal energy to be stored or released quickly, because of the enhanced effective thermal conductivity. The quick storage of thermal energy can enable the subject device to be used to cool electronic devices with very small temperature increases in the electronic device that is being cooled.

Advantageously, the high conductivity host material can rapidly transfer the heat to the thermal energy storage system throughout a portion of, or the entirety of, the volume of the phase change material. The high conductivity host material of the subject invention conducts the thermal energy through the host material and into the phase change material over a large surface area of thermal contact between the host material and the phase change material. This feature can produce a very high rate of heat absorption.

A specific embodiment for the subject invention can be incorporated with high power diode-pumped solid-state laser systems with laser output powers, for example, ≧100 kilowatts. These laser systems fire numerous laser light bursts over a short period of time (<1 minute) and can generate over 900 kilowatts of waste heat throughout the entire laser operation. The surface to which the laser device is mounted must be maintained at or below 20° C. to maintain diode operating temperatures at 60°; requiring the coolant loop operating temperatures to be below ambient (e.g. 5-10° C.). If a cold temperature heat sink operating at a temperature lower than the coolant loop (e.g. ≦0° C. is unavailable, a refrigeration cycle is required to reject the laser waste heat. To remove over 900 kW using a refrigeration cycle in real time would require an extremely large refrigeration unit and would not be practical for most applications. Incorporating the subject thermal energy storage unit as a heat absorber in the laser cooling loop can allow the laser waste heat to be absorbed and stored in the subject thermal energy unit during the laser operation time and slowly rejected over a longer period of time when the laser is non-operational, greatly reducing the refrigeration cycle volume and mass needed. The subject method can also be applied to the thermal management of power electronics and other heat generating systems where the duty cycle is low. An example of a low duty cycle is a device that produces a large amount of heat for 1 second to 60 seconds, and then does not produce heat for 100 seconds to 600 seconds.

DETAILED DESCRIPTION OF INVENTION

Figure 1:
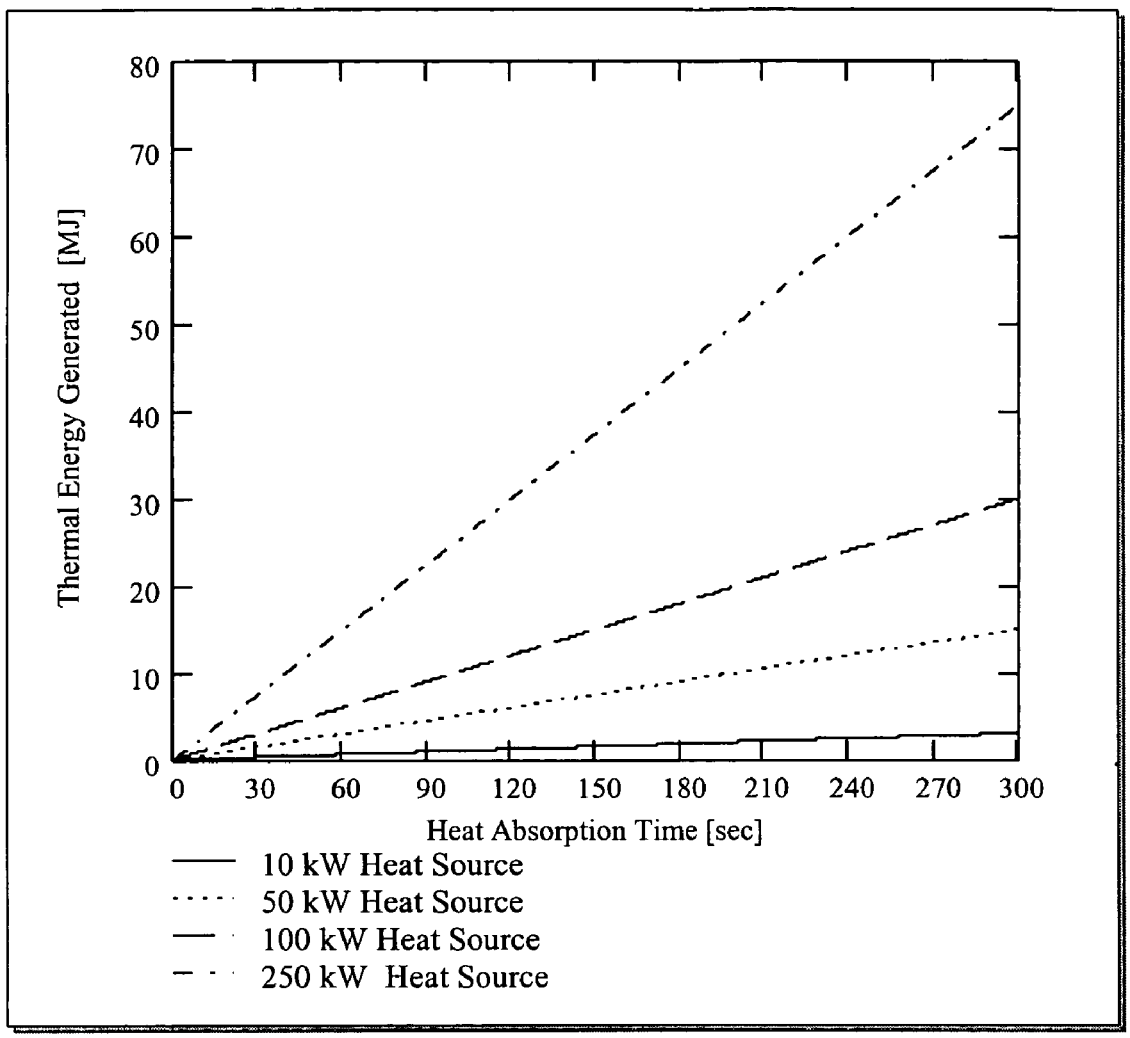
FIG. 1 shows the thermal energy generation for four heat loads, Q=1 kW, Q=50 kW, Q=100 kW and Q=250 kW and laser operation times from 0 to 300 seconds.

The subject invention pertains to a method and apparatus for storing thermal energy. In a specific embodiment, the subject thermal energy storage apparatus can function as a heat absorber in a cooling system. In a further specific embodiment, a cooling system can incorporate a cooling cycle that utilizes thermal energy storage and has two coolant loops. The primary cooling loop acquires the waste heat from a heat source, such as an electronic device, by heat transfer to the primary coolant via, for example, a sensible heat process (where sensible heat is heat absorbed or transmitted by a substance during a change in temperature which is not accompanied by a change of state) or by evaporating the primary coolant through a latent heat phase change process.

The waste heat absorbed by the primary coolant is transferred to the host material of the heat absorber. In a specific embodiment, the waste heat is transferred to the host material of the heat absorber by tubing that can have, for example, a circular, square, rectangular, or other cross-sectional shape. The tubing, or plumbing, can be fabricated from materials such as, but not limited to, aluminum, stainless steel, and copper. The plumbing material is preferably compatible with the working fluid in the primary cooling loop. Heat can, preferably, be transferred through the plumbing wall. In a specific embodiment, a manifold can be used to distribute the heated coolant from the primary loop through a series of plumbed channels that are embedded in the thermal energy storage host material. The heat from the primary coolant loop is transferred through the wall of the plumbing to the high thermal conductivity porous host material, which disperses the heat quickly throughout the host material and melts the phase change material absorbing the heat from the primary coolant through a latent heat transfer process.

In a further specific embodiment, the energy stored in the heat absorber is later removed through a second series of embedded plumbed tubes of a secondary coolant loop that cools, for example freezes, the phase change material, effectively dissipating the heat from the heat absorber. The secondary coolant loop can be a water chiller, a refrigeration cycle, a cool liquid pump loop, or some other cooling technique that removes heat. The plumbing for transferring heat from the heat absorber to the secondary coolant loop can have, for example, a circular, square, rectangular, or other cross-sectional shape, and can be fabricated from materials such as, but not limited to, aluminum, stainless steel, and copper. In a specific embodiment, the secondary coolant loop can be fabricated from similar materials and have similar cross sectional geometries as the primary cooling loop.

In a specific embodiment, the heat absorber host material can be a porous matrix of graphite, metal foam, or other porous media. Additional specific embodiments of the subject invention can incorporate host materials having single or multi-layer mesh structures, finned or ribbed geometries, structures with honeycomb characteristics, and/or electroplated patterns. Such features can enable the host material to form void volumes within the material that can be filled by a phase change material. The host material can be fabricated from, for example, metals, ceramics, graphite materials, diamonds, and/or plastics that have relatively high thermal conductivities. The thermal conductivity and porosity of the thermal energy storage host material can be selected to achieve the results needed by the application being addressed. Phase change materials melt and solidify within a certain temperature range allowing energy to be stored and released at nearly a constant temperature. Typical phase change materials include, but are not limited to, water, organic paraffin, oils, and inorganic salts.

The function of the thermal energy storage heat absorber is to rapidly remove heat from the primary coolant loop, during a specified time period, storing the heat in the phase change material. The stored energy is then removed by the secondary coolant loop over a longer period of time that can be, for example, at least 2 times, at least 5 times, at least 10 times, at least 30 times, at least 50 times, and/or at least 100 times as long as the absorption period. The amount of thermal energy that must be absorbed by the heat absorber is a function of the heat load, Q, generated by the heat source, and the total $$E_{stored} = Q \cdot t_{on} \tag{1}$$

operation time, $t_{on}$ (Equation 1). FIG. 1 illustrates the relationship between the thermal energy generated and the operation time for several heat loads (Q=1 kW, Q=50 kW, Q=100 kW, Q=250 kW). The rate that heat is released, or removed, from the heat absorber, $Q_{released}$, depends on the amount of energy stored in the heat absorber and the time duration that the heat is being removed from the absorber, $t_{released}$ (where $t_{released}$ can be $t_{off}$, $t_{off}+t_{on}$, or some other period of time, where $t_{off}$ is the time period that the heat source is not generating heat) (Equation 2).

$$Q_{released} = \frac{E_{stored}}{t_{released}} \tag{2}$$

In a specific example, if a heat source is generating 100 kW of waste heat during a 30 second operating period, and then releases that heat over a 300 second time period, the heat released from the absorber during the 300 second period would be 10 kW. The heat can be released while the heat source is not generating waste heat and/or while the heat source is generating heat, or some portion of one or both of these periods of time.

Three important properties of a host material are: the total porosity ($\epsilon_{total}$), the open porosity ($\epsilon_{open}$), and the thermal conductivity (k). The total porosity is the total percentage of void volume of open space in the material whether the space is interconnected to other voids or closed. In a preferred embodiment, the subject invention utilizes a host material having a porosity in the range from about 0.2 to about 0.8; in a more preferred embodiment in the range from about 0.5 to about 0.8; and in an even more preferred embodiment a total porosity in the range from about 0.6 to about 0.75. The open porosity of the material refers to the percentage of the volume of the voids that is open or interconnected and will allow the phase change material to fill the void. In a preferred embodiment, the subject invention utilizes a host material having an open porosity in the range from about 0.6 to about 1.0; in a more preferred embodiment in the range from about 0.8 to about 1.0; and in an even more preferred embodiment an open porosity in the range from about 0.95 to about 1.0.

Another consideration when selecting the host material for the subject invention is the average pore size and its impact on spatial pore distribution within the host material. The individual pore shape can be for example, circular, square, hexagonal or some other irregular shape. A preferred embodiment of the subject invention incorporates a host material having an average pore size in the range from about 50 to about 1000 microns; in a more preferred embodiment in the range from about 100 to about 500 microns; and in an even more preferred embodiment in the range from about 300 to about 400 microns. Preferably, there should be few, if any, individual pore diameters, so long as there is no average pore diameter larger than 1000 microns. The open and total porosities yield the effective porosity ($\delta_{eff}$) of material, or the total amount of interconnected pore or void volume that can be filled with phase change material, or the effective porosity (Equation 3).

$$\epsilon_{eff} = \delta_{total} \cdot \epsilon_{open} \qquad (3)$$

Figure 2:
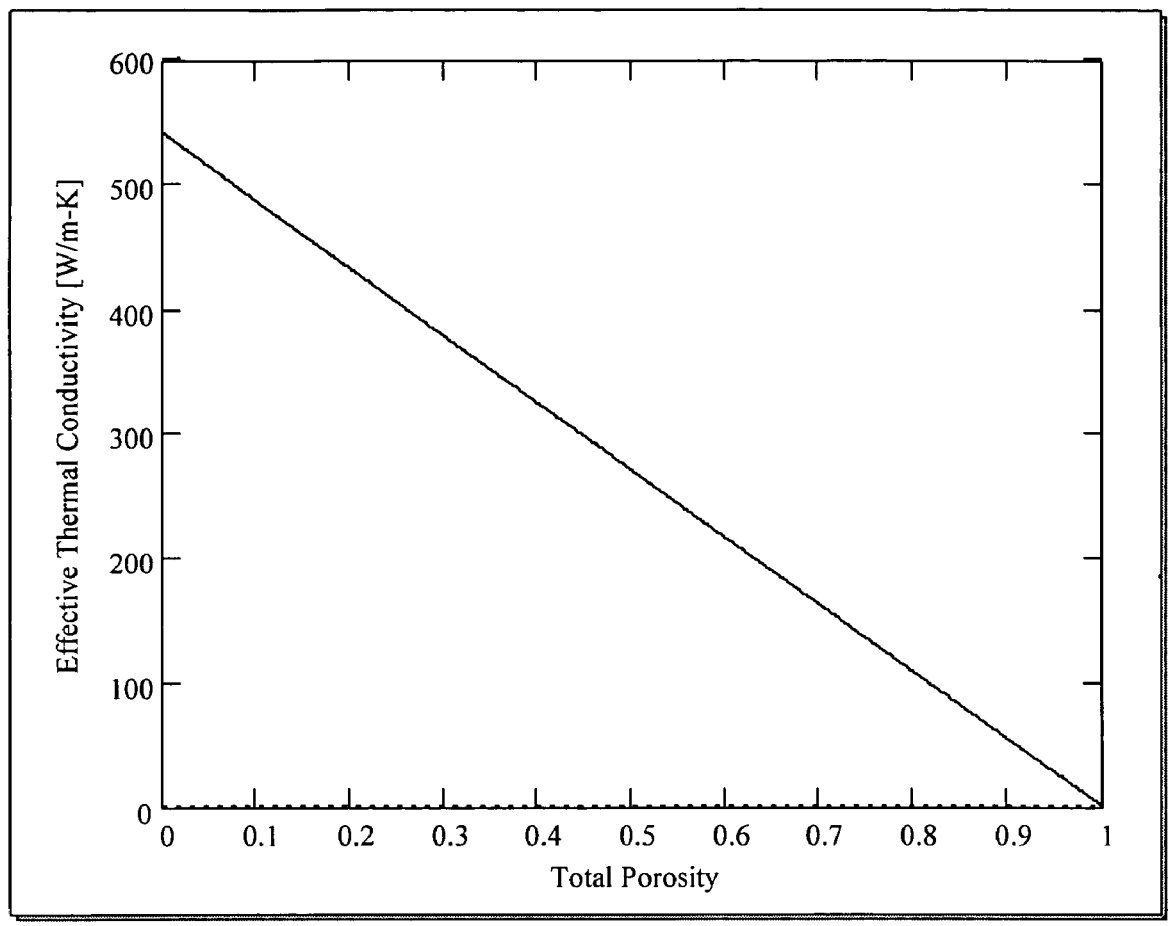
FIG. 2 shows varying total porosity of a host material (0% to 100%) versus the effective thermal conductivity of the heat absorber, for a phase change material having a thermal conductivity of 0.2 W/m-K and a host material having a thermal conductivity of 540 W/m-K.

The total and effective porosities of the host material can be used to determine the effective thermal conductivity ($k_{eff}$) of the host material filled with phase change material (Equation 4). The effective thermal conductivity is a function of $$k_{eff} = (1-\epsilon_{total}) \cdot k_{HM} + (\epsilon_{total} \cdot E_{open}) \cdot k_{PCM} + \epsilon_{total} \cdot (1-\epsilon_{open}) \cdot k_{gas} \qquad (4)$$

the thermal conductivities of the host material ($k_{HM}$), the phase change material ($k_{PCM}$) and the thermal conductivity of any gas trapped in closed pores ($k_{gas}$). The impact of total porosity on the effective thermal conductivity is illustrated in FIG. 2. This figure assumes that paraffin is used as the phase change material and has a thermal conductivity of $k_{PCM} \cong 0.2$ W/m-K, and that the host material has a thermal conductivity of $k_{HM} \cong 540$ W/m-K, and an open porosity of $\epsilon_{open} \cong 1$. If there were no voids in the material, meaning there was no total porosity, the effective thermal conductivity is equal to that of solid graphite, and as the total porosity approaches 100% the effective thermal conductivity of the matrix would approach that of the paraffin.

The thermal conductivity (k) of the host material is preferably selected so that the thermal resistance between the primary coolant and the phase change material is low and heat is transferred quickly without inducing large temperature gradients along the heat transfer path. The operating temperature of most semi-conductor and electronic devices preferably does not increase by more than 5-20° C. during operation and is maintained in a proper range due to the heat transfer between the heat absorber and the device being cooled. Preferably, the thermal conductivity of the host material is about 2-3 orders of magnitude higher than the thermal conductivity of the phase change material. In a specific embodiment, thermal conductivity for the host material is between about 50 W/m-K and about 500 W/m-K. Examples of host materials with thermal conductivities in materials such as carbon graphite and diamond materials, which can have high thermal conductivities that can range from about 500 W/m-K to over 2000 W/m-K. The effective thermal conductivity of the host material filled with phase change material should be high enough to allow a sufficient thermal heat transfer rate to meet the needs of the application. In a specific embodiment of the subject invention, the effective thermal conductivity of the host material filled with phase change material is in the range from about 10 to about 2000 W/m-K; in another specific embodiment, the effective thermal conductivity of the host material filled with phase change material is in the range from about 50 to about 1500 W/m-K; and in another specific embodiment, the effective thermal conductivity of the host material filled with phase change material is in the range from about 100 to about 500 W/m-K.

Figure 3:
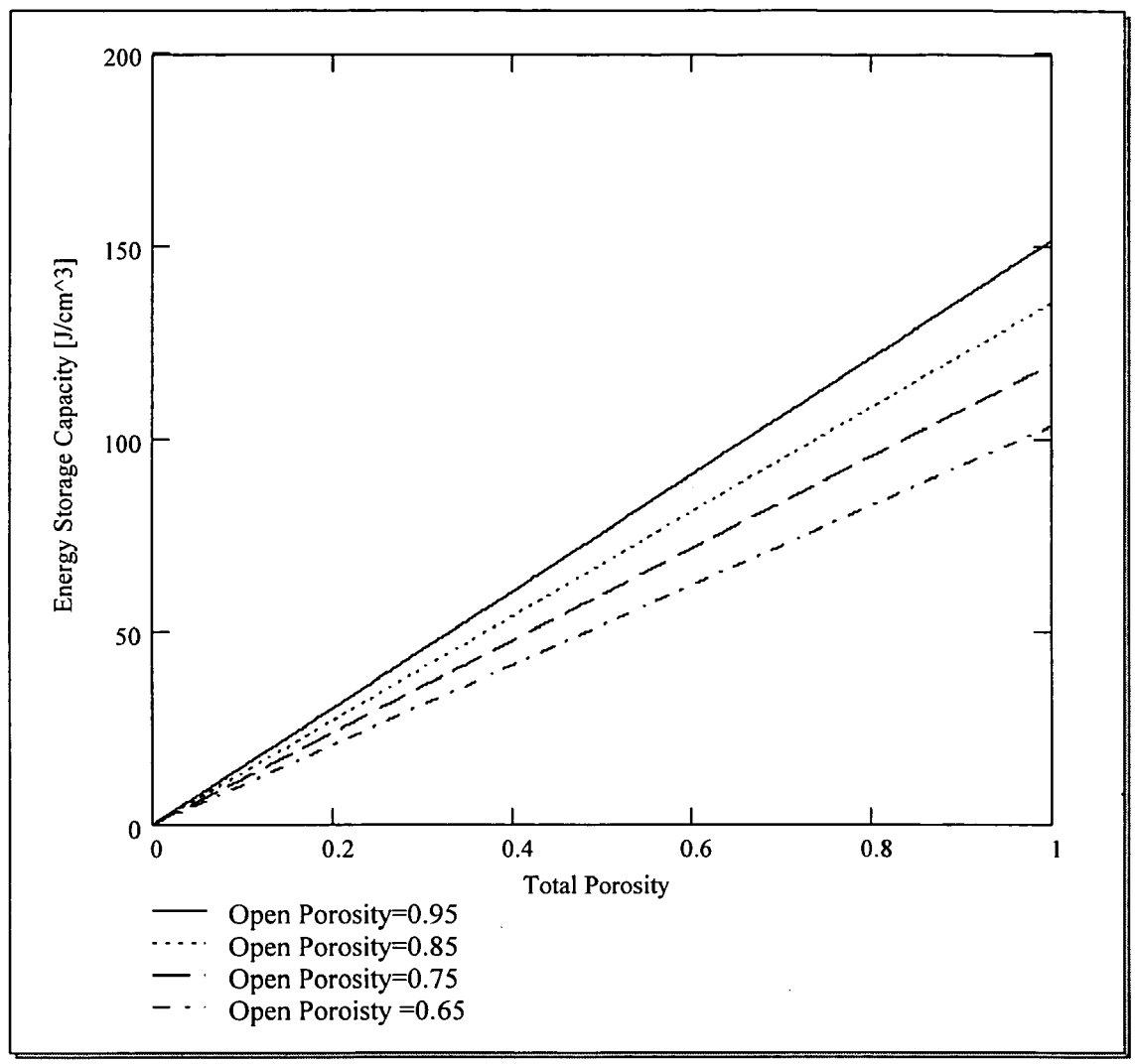
FIG. 3 shows the thermal energy storage capacity (J/cm$^3$) of the heat absorber matrix for total porosities ranging from 0 to 100% at four different open porosities (65%, 75%, 85% and 95%), for a phase change material having a latent heat of fusion of 200 kJ/kg and a liquid density of 800 kg/m³.

The total energy storage capacity (Joules/volume) of the material is a function of the total and open porosities of the host material, the latent heat of fusion for the phase change material ($\lambda_{PCM}$), and the density of the phase change material ($\rho_{PCM}$) and can be evaluated using Equation 5. The relationship between host material porosities and $$E_{capacity} = \lambda_{PCM} \cdot \rho_{PCM} \cdot \epsilon_{total} \cdot \epsilon_{open} \qquad (5)$$

thermal energy storage capacity of the heat absorber matrix can be visualized in FIG. 3. This specific example, assumes a host material is filled with a phase change material with a latent heat of fusion of 200 kJ/kg and a liquid density of 800 kg/m$^3$. The thermal energy storage capacity (J/cm$^3$) is presented for total porosities varying from 0% to 100% at four specific open porosities (65%, 75%, 85%, 95%) represented by four separate curves. It is evident from this figure that higher total porosity materials can store more thermal energy per unit volume, for the same open porosities. The latent heat of fusion, for the phase change material used in the subject invention, $\lambda_{PCM}$, is preferably in the range from about 10 to about 350 kJ/kg, more preferably in the range from about 100 to about 300 kJ/kg, and even more preferably in the range from about 150 to about 250 kJ/kg. In order to maximize the energy storage capacity of the subject invention the latent heat of fusion of the phase change material should be as high as possible.

Several phase change materials offer latent heat characteristics that would be desirable for use in a heat absorber application. A specific embodiment of the subject invention can utilize organic paraffin, where the latent heat of fusion for organic paraffin's can range from about 100 kJ/kg to about 250 kJ/kg. Inorganic salts and salt hydrate phase change solutions can also be utilized with the subject invention and have latent heat of fusion properties ranging from about 50 kJ/kg to about 350 kJ/kg. Water has a latent heat of fusion value of ~330 kJ/kg and can also be utilized with the subject invention. Consideration must be taken when selecting the phase change material for optimum heat transfer characteristics as well as mechanical considerations such as the volume differences between the liquid and solid states of the phase change material.

The effective thermal conductivity and energy storage capacity of the host material must be optimized to meet the operating requirements of the device being cooled. The total porosity has the largest impact on both the effective thermal conductivity and the thermal energy storage capacity. In a host material that has a high porosity there is more phase change material than host material, therefore the effective thermal conductivity will be lower, tending to result in a larger temperature gradient between the heat absorber and the electronic device being cooled. If the total porosity of the host material is decreased the temperature gradient will also tend to be reduced, but the thermal energy storage capacity will tend to decrease leading to a lower heat absorption rate for a specified volume of material.

The phase change material can be placed into the host material through a variety of processes. In a specific embodiment, the phase change material is heated remotely until it is in a liquid form and then the host material is immersed in the liquid phase change material until the desired amount of phase change material is soaked into the porous host material. In another specific embodiment, dispersing the phase change material, involves pulling a vacuum on the host material, heating the phase change material until it reaches a liquid state and then releasing the liquid phase change material into the host material via a pressure-driven flow. Pulling a vacuum on the host material can ensure most, if not all, of the air is removed from the void volumes in the host material, such that a high amount of phase change material fills the void volumes in the host material.

A specific embodiment of the invention uses high thermal conductivity graphite foam developed by Oak Ridge National Laboratory (Poco Graphite, Inc. manufactures two graphite foam products in accordance with this technology, e.g., POCO FOAM™ and POCO HTC™). U.S. Pat. No. 6,033,506 teaches methods of making carbon foam that can be used as a host material in accordance with the subject invention, and is hereby incorporated by reference in its entirety. The graphite foam can be considered to augment the low thermal conductivity of paraffin phase change material. The graphite foam's porous structure can allow paraffin to fill in the voids in the foam and increase the surface to volume ratio, allowing the energy to be stored and released from the PCM quickly. Poco Graphite, Inc.'s POCO FOAM™ material has an out-of-plane thermal conductivity of k=145 W/m-K, a total porosity of $\epsilon_{total}$=0.75, an open porosity of $\epsilon_{open}$ =0.96, and an average pore size of 350 microns. Poco Graphite, Inc.'s POCO HTC™ graphite foam has a thermal conductivity of k=245 W/m-K in the out-of-plane direction, a total porosity of $\epsilon_{total}$=0.61, an open porosity of $\epsilon_{open}$=0.95, and an average pore size of 350 microns. Another specific embodiment of the subject invention uses a low temperature paraffin ASTOR™ Astorphase 3, which is manufactured by Honeywell Specialty Wax and Additives, as a plane change material. Astorphase 3 has unique material properties that are conducive for the phase change material for a heat absorber that is used in a solid-state laser cooling system due to is low melting point of approximately 5° C. and the relatively high latent heat of fusion of 171.2 kJ/kg.

Figure 4:
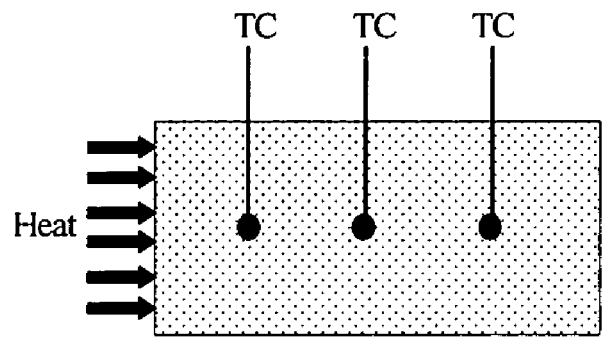
FIG. 4 schematically illustrates an experimental set-up for studying the heat transfer properties of graphite foam filled with paraffin.
Figure 5:
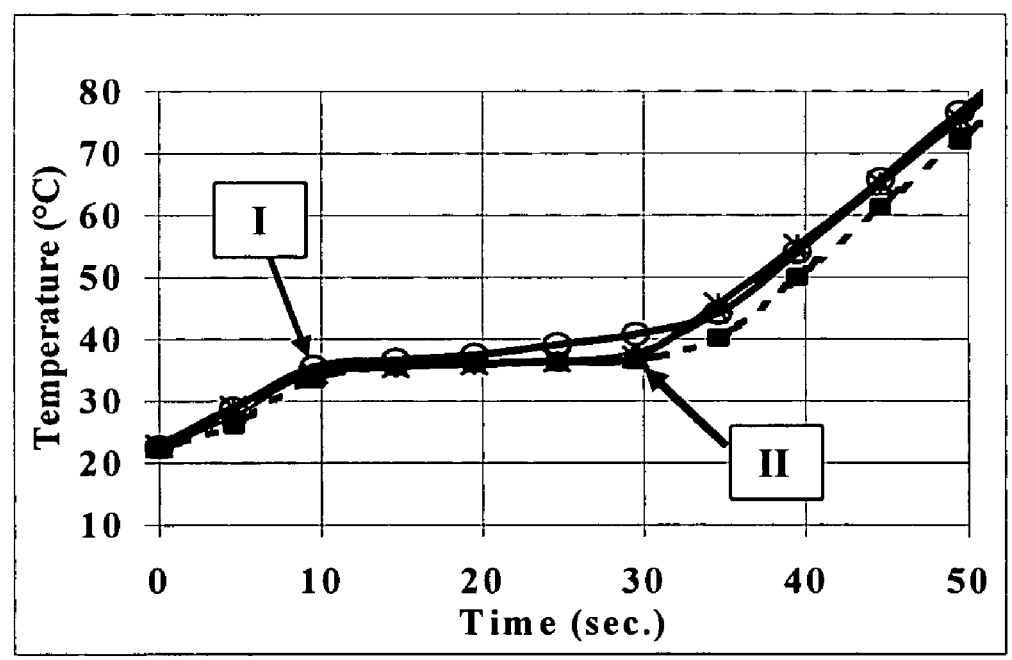
FIG. 5 shows experimental data from experiments performed with the experimental set-up shown in FIG. 4.

Rini Technologies, Inc. has performed successful thermal energy storage tests with Poco Graphite, Inc.'s POCO FOAM™ graphite foam filled with Honeywell's Astorphase 42 X, which has a melting point of approximately 40° C. and a latent heat of fusion above 200 kJ/kg. These experiments have shown that porous graphite foam filled with paraffin makes an ideal heat absorber. During these experiments, referring to FIG. 4, thermocouples were embedded at increasing distances from the heated surface to record the temperature during the experiment. The experimental data, shown in FIG. 5, shows the temperature profile of three thermocouples embedded in the graphite foam, where —● represents the first thermocouple, x represents the second thermocouple, and —■ represents the third thermocouple. In the first few seconds of the experiment leading up to point I, a sensible heat transfer process is taking place in the solid paraffin. The phase change of the paraffin takes place between points I and II when the paraffin reaches its melting point and absorbs heat through a latent heat transfer process, while maintaining the temperature within the foam within a relatively small range. After point II, all the paraffin has melted and the temperature begins to increase again as the liquid wax begins absorbing heat through a sensible heat transfer process. The experimental results clearly show that the high thermal conductivity of the graphite foam leads to a bulk melting process and a melting front which travels from the device surface in thermal contact with the heat source to the first thermocouple and then to the second thermocouple and then to the third thermocouple is not present. In a normal phase change process, there is an interface that exists between liquid and solid regions, which moves through the bulk phase change material during the phase change process. Although smaller scale melting fronts are likely present, the experimental results show that at applied heat fluxes of 5 W/cm$^2$ or less there is no bulk melting front moving from the end of the device in thermal contact with the heat source to the other end with the TES geometry tested. Furthermore, all thermocouples have a relatively flat slope in the phase change region (between points I and II), indicating that all the paraffin is melting at approximately the same time. However, it is important to note that for thicker TES geometries or applied heat fluxes greater than 5 W/cm$^2$ a bulk melting front would likely be present.

Figure 6A:
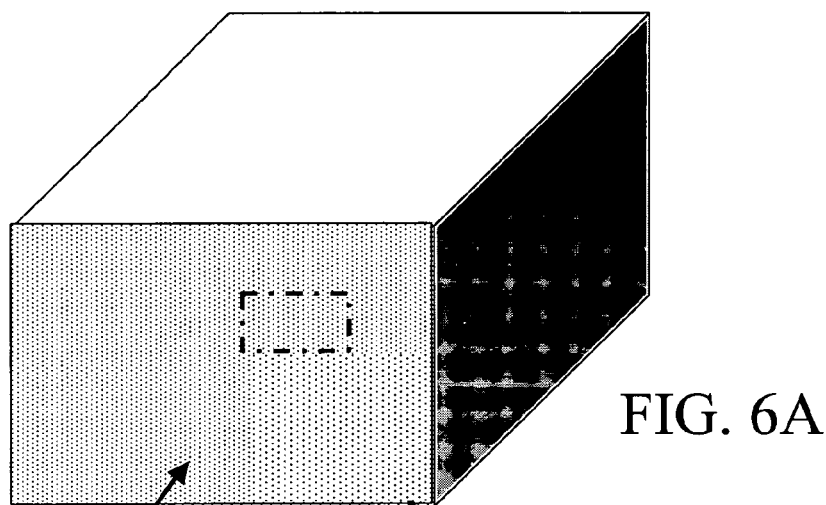
FIG. 6A schematically illustrates a heat absorber in accordance with the subject invention.
Figure 6B:
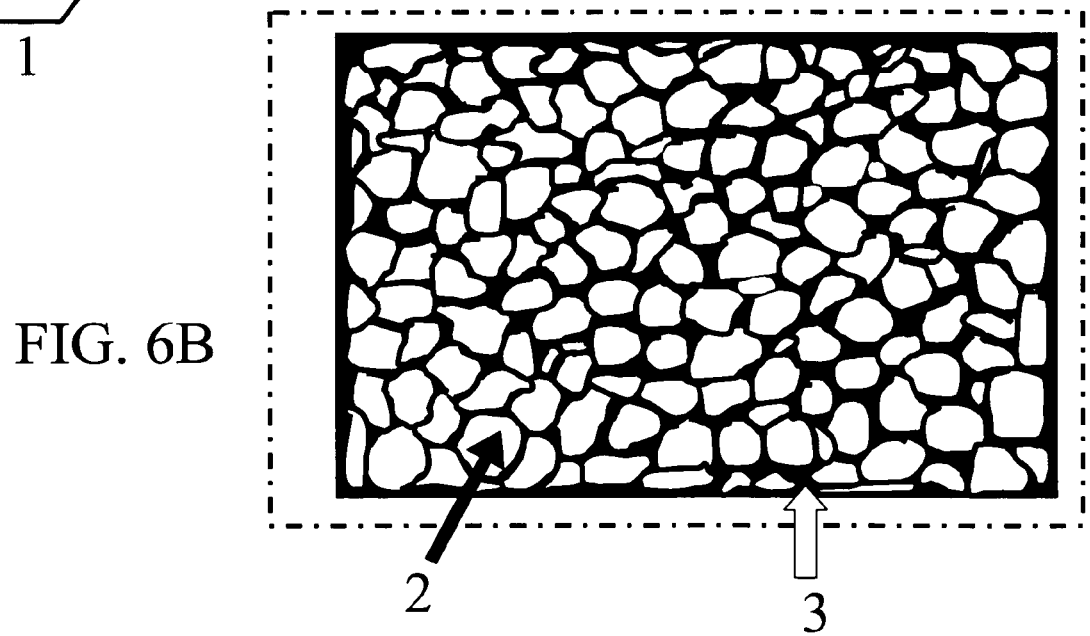
FIG. 6B shows a closer view of the heat absorber of FIG. 6A, showing the host material and voids in the host material.

The subject invention pertains to a method and apparatus for storing thermal energy. The subject invention also relates to a method and apparatus for absorbing thermal energy from a heat source. In a specific embodiment, the subject thermal energy storage apparatus can function as a heat absorber in a cooling system. The subject heat absorber can absorb large amounts of waste heat over short time periods, such as time periods of less than about a minute, and then slowly reject that heat to the ambient environment over longer time periods, such as time periods over about 30 minutes. FIGS. 6A and 6B schematically illustrate a heat absorber 1 in accordance with the subject invention. The heat absorber 1, shown in FIGS. 6A and 6B, includes a phase change material, which is stored in the pores 2 of the host material. The host material 3 that encloses the phase change material 2 can be, but is not limited to, a metal foam or graphite foam material that has a high thermal conductivity, k. In a specific embodiment, the host material filled with phase change material has an effective thermal conductivity of at least about 100 W/m-K. The subject heat absorber can be manufactured in a variety of geometric shapes to accommodate the arrangement of the cooling system.

Figures 7A, 7B:
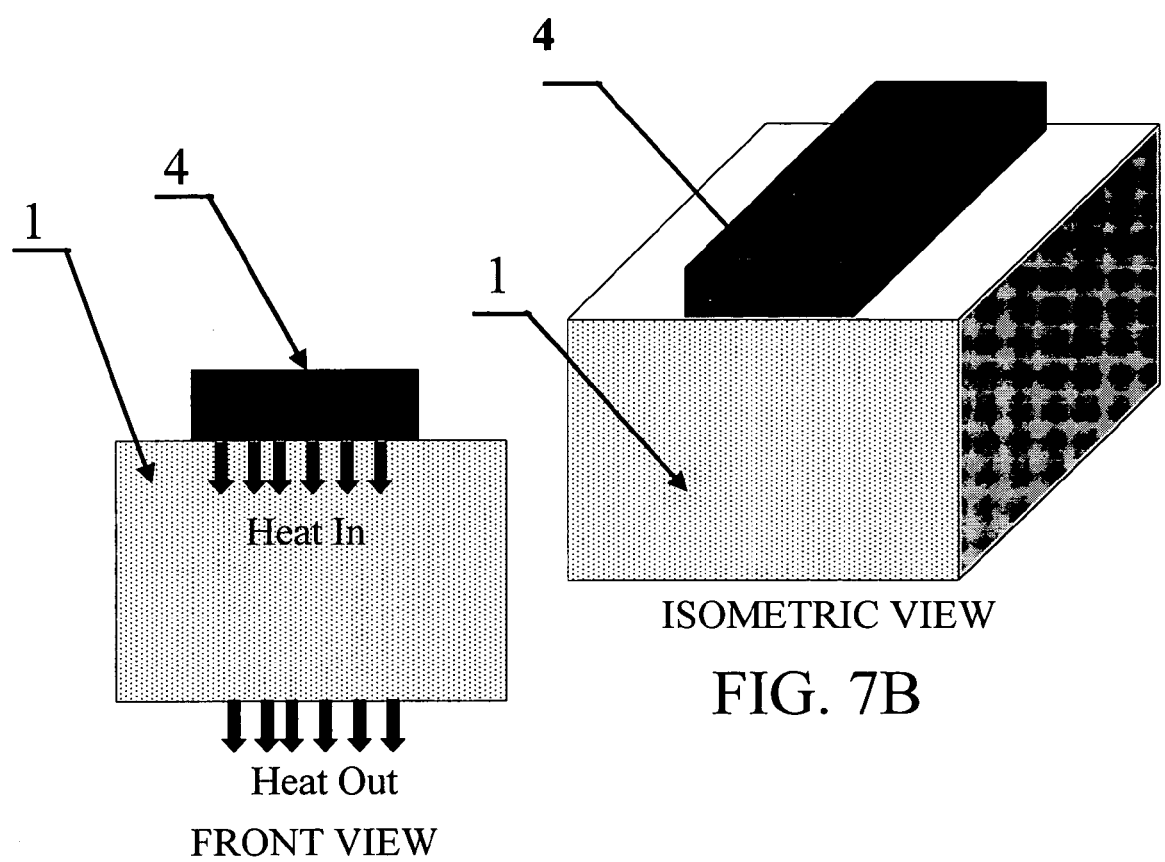
FIG. 7A schematically illustrates a heat absorber in thermal contact with a heat source in accordance with a specific embodiment of the subject invention.
FIG. 7B schematically illustrates an isometric view of the heat absorber of FIG. 7A.

A specific configuration of a heat absorber in accordance with the subject invention is shown in FIGS. 7A and 7B. A heat source 4, such as a heated electronic device, a laser diode, a computer processing chip, or other heat generating electronic device, is in thermal contact with the heat absorber 1. Thermal contact can be achieved by, for example, directly mounting the heat source to the heat absorber. The heat generated by the electronic device is conductively transferred to the heat absorber surface. The high thermal conductivity host material 3 quickly disperses the heat throughout the heat absorber. If enough heat is absorbed, the heat melts the phase change material 2 that is enclosed in the pores. The heat absorber volume should be appropriately sized for the operation of the electronic device, ensuring an adequate amount of phase change material is present to melt and store the waste heat. Following the nominal operation of the electronic device the heat is rejected from the heat absorber by some method of, for example, conduction, convection, and/or radiation. This heat can be rejected from a separate surface on the absorber similar to that shown in FRONT VIEW of FIG. 7A. In a specific embodiment, a cold plate can be mounted to the bottom surface. The cold plate can slowly solidify the melted phase change material effectively removing the stored energy from the heat absorber.

Figure 8:
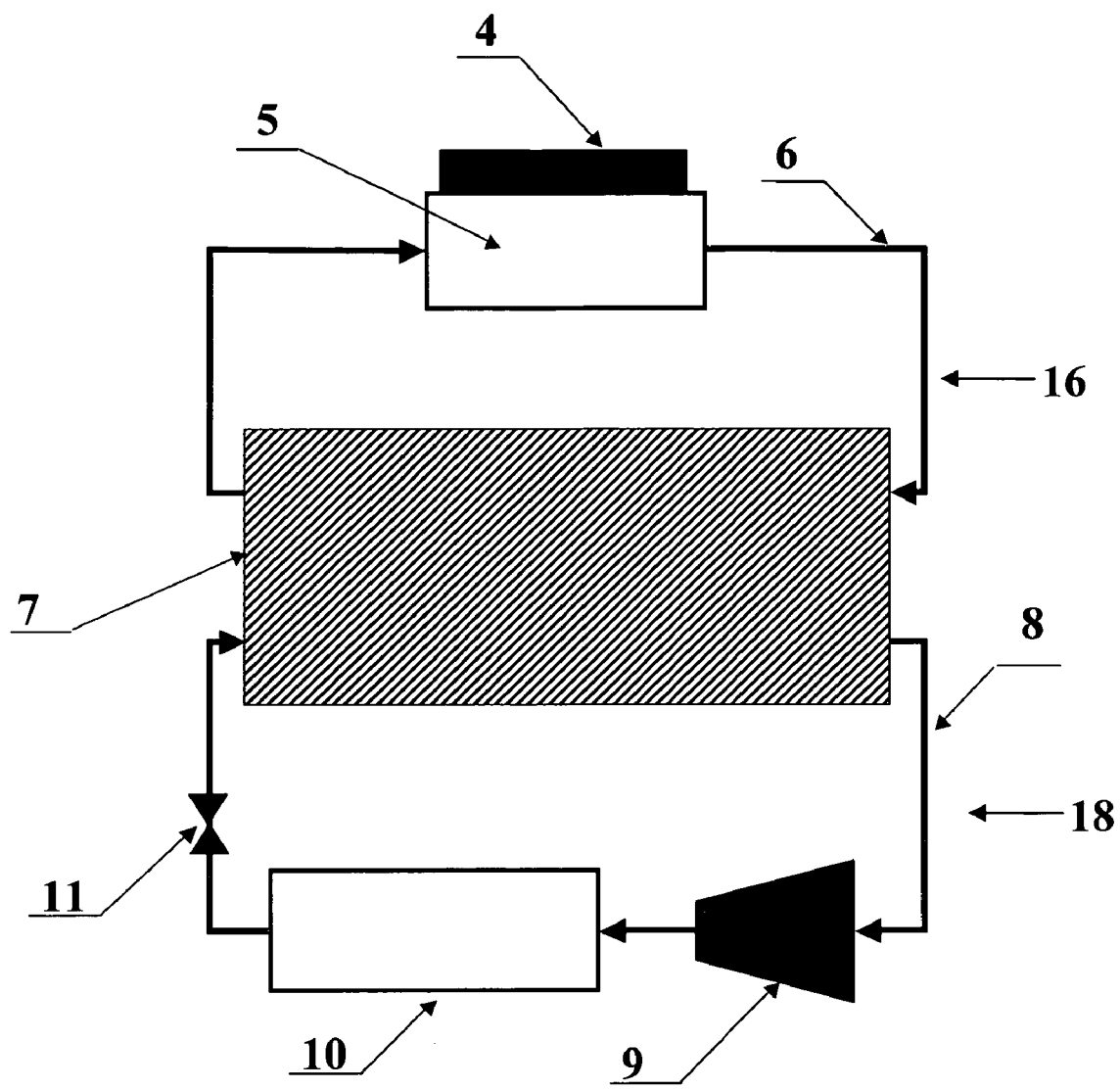
FIG. 8 schematically illustrates a closed cycle cooling system that uses a specific embodiment of the subject invention FIG. 9A schematically illustrates the specific embodiment of the subject invention that will function as a heat absorber in the cooling cycle depicted in FIG. 8.

Another specific embodiment of the subject invention can incorporate the subject heat absorber into a closed loop cooling cycle that has two separate cooling loops, such as a primary cooling loop 16 and a secondary cooling loop 18. The primary loop and/or the secondary loop can be any of many means known in the art for removing heat. Examples include a water chiller, a refrigeration cycle, a cold liquid pump pool, and spray-cooling evaporator. Although FIG. 8 shows primary coolant tubing 6 and secondary coolant tubing 8 entering and leaving heat absorber 7 at different locations, alternative embodiments can utilize one set of coolant tubing traveling through the heat absorber 7. For example, the primary coolant can flow through the set of coolant tubing and then, via valving and/or switching known in the art, the primary coolant can be turned off and the secondary coolant can be allowed to flow through the coolant tubing. In this way the primary and secondary coolants can share coolant tubing.

Referring to FIG. 8 in a closed cycle configuration the primary cooling loop can acquire the waste heat generated by the electronic device 4, or other heat source, through a heat exchanger device functioning as an evaporator 5. In a specific embodiment, the heat exchanger 5 can be a single-phase sensible heat exchanger where coolant flows through the heat exchanger increasing the primary coolant temperature while absorbing thermal energy from the heat source. In another specific embodiment, the heat exchanger can be an evaporative heat exchanger 5 that utilizes a two-phase cooling process that takes advantage of the latent heat of vaporization to dissipate the heat load through the phase change of the primary coolant. Specific examples of these two types of evaporators can be, but are not limited to, water liquid heat exchangers, micro-channel coolers, evaporative spray cooling nozzle arrays, or small heat absorbing units. Evaporative spray cooling techniques can involve spraying via one or more spray nozzles a coolant onto a surface such that the coolant absorbs heat and flows and/or evaporates from the surface so as to remove heat from the surface. The primary coolant can use traditional cooling fluids such as water, ammonia, refrigerants like R-134a or R22, or other appropriate cooling fluids. The heated or vaporized primary coolant is transferred to the heat absorber 7 by plumbing or tubing 6 that can have, for example, a circular, square, rectangular, other cross-sectional shape. The plumbing or tubing 6 can be fabricated from materials such as, but is not limited to, aluminum, stainless steel, and copper. Preferably, the material is compatible with the working fluid in the primary cooling loop and heat can be transferred through the plumbing or tubing 6 wall. The primary coolant is then in thermal contact with the host material of the heat absorber. In a specific embodiment, plumbing can be embedded in the heat absorber host material to allow the primary and secondary cooling loops to transfer heat to and from the heat absorber device. Techniques for embedding the coolant tubing, or plumbing, in the heat absorber can be used to enhance the thermal energy transfer from the tubing to the heat absorber host material and/or phase change material. Such techniques include, but are not limited to, using a molten material that solidifies to bond the tubing to the material, using thermal epoxies to bond the tubing to the host material, soldering the tubing to the host material, and other techniques known in the art for creating better contact between the tubing and the host material.

Figure 9A:
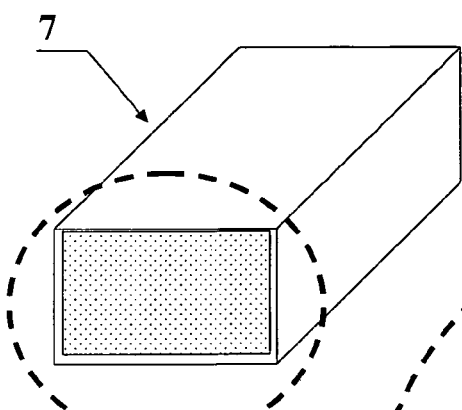
FIG. 9B schematically illustrates a front view of the heat absorber of FIG. 9A, showing coolant tubing embedded in the heat absorber.
Figure 9B:
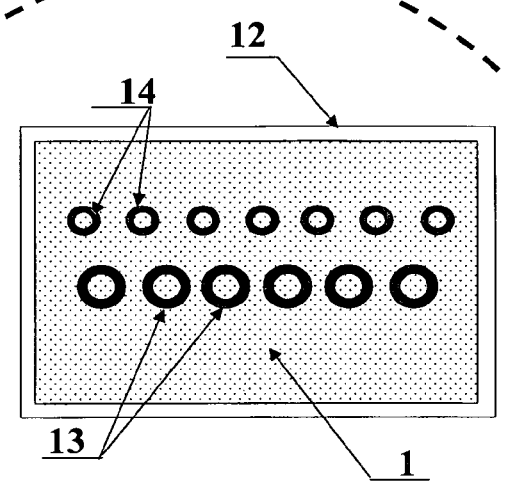

FIGS. 9A and 9B schematically illustrate a cross-section of an embodiment of the subject heat absorber incorporating embedded plumbing, which assists the heat transfer between the host material and the coolant. The heat from the primary coolant loop enters the heat absorbers through a series of primary coolant channels 13 that are embedded in the thermal heat absorber 1 as shown in FIGS. 9A and 9B. The primary coolant traveling in the primary coolant channels 13 is cooled or condensed removing heat from the primary cooling loop and effectively storing the heat in the heat absorber 7 unit allowing the primary coolant to return to the evaporator 5 to continue to cool the electronic device 4.

Referring again to FIGS. 9A and 9B, a specific embodiment of a closed cycle heat absorber 7 configuration is depicted. An external frame or housing 12 can be incorporated to prevent the phase change material 2 from leaking out of the porous heat absorber heat material 3. The frame 12 can be fabricated from a variety of materials such as, but not limited to metals, plastics, and composite materials. Preferably, the frame material is compatible with the host material and the phase change material and provides adequate structural support. In the embodiment shown in FIGS. 7A and 7B, the heat from the primary coolant loop is transferred through the wall of the primary coolant channels 13 to the high thermal conductivity host material 3, which disperses the heat quickly throughout the volume of the heat absorber 7. In a specific embodiment, the heat absorber is designed such that the heat is dispersed throughout the volume of the heat absorber within about a minute, melting the phase change material 2 and absorbing the heat from the primary coolant through a latent heat transfer process.

Referring again to FIGS. 9A and 9B, the energy stored in the closed cycle heat absorber 7 is slowly removed by a secondary coolant loop 18 through a heat rejector 9 over an extended period of time. A specific embodiment of the heat rejector 9 would be a cold temperature liquid pump loop or in another embodiment a standard vapor compression refrigeration cycle, or some other cooling method that removes the heat from the secondary cooling loop 18. In a specific embodiment, the heat removal period is at least about 10 times longer than the absorption period. In additional embodiments, the heat removal period is at least about 2, 5, 10, 20, 30, 50, and 100 times as long as the absorption period, respectively. A standard refrigerant such as R-22, R-134a, or ammonia can be used as the secondary coolant. Heat is transferred from the phase change material through the walls of the second set of embedded plumbing channels 14 that freeze or solidify the phase change material 2 transferring the heat to the secondary cooling channels 14 through a latent heat of vaporization process. Referring to FIG. 8, the vaporized secondary coolant is transferred by plumbing or tubing 8 to the heat rejector 9, which removes the heat stored in the secondary cooling loop 18 allowing the secondary coolant to condense and be returned to the heat absorber 7.

As is apparent to one skilled in the art, the subject heat absorber can be incorporated with a variety of types of cooling systems in a variety of configurations.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A method for absorbing thermal energy from a heat source, comprising:
absorbing thermal energy from a heat source via a heat exchanger so as to transfer thermal energy from the heat source to a primary coolant;
transporting the primary coolant from the heat exchanger to a heat absorber so as to transfer thermal energy from the primary coolant to the heat absorber, wherein transporting the primary coolant from the heat exchanger to a heat absorber comprises transporting the primary coolant from the heat exchanger to a heat absorber comprising a phase change material, wherein transfer of thermal energy from the primary coolant to the heat absorber melts at least a portion of the phase change material, wherein the heat absorber comprises a host material having voids that are filled with the phase change material such that the phase change material is in thermal contact with the host material, wherein the heat absorber comprises primary coolant tubing embedded in the heat absorber, wherein the primary coolant tubing is in thermal contact with at least a portion of the host material, wherein the primary coolant travels through the primary coolant tubing, wherein thermal energy is transferred from the primary coolant to the phase change material through the primary coolant tubing; and
removing thermal energy from the heat absorber, wherein removing thermal energy from the heat absorber comprises:
transferring thermal energy from the heat absorber to a secondary coolant, wherein the heat absorber comprises secondary coolant tubing embedded in the heat absorber, wherein the secondary coolant tubing is in thermal contact with at least a second portion of the host material, wherein the secondary coolant travels through the secondary coolant tubing, wherein thermal energy is transferred from the phase change material to the secondary coolant through the secondary coolant tubing.

2. The method according to claim 1, wherein absorbing thermal energy from a heat source via the heat exchanger comprises absorbing thermal energy from a heat source at a first rate of thermal energy transfer during a first period of time, wherein dissipating thermal energy from the heat absorber comprises dissipating thermal energy from the heat absorber at a second rate of thermal energy transfer during a second period of time, wherein the first rate of thermal energy transfer is higher than the second rate of thermal energy transfer, and the first period of time is shorter than the second period of time.

3. The method according to claim 2, wherein the second period of time is at least 2 times as long as the first period of time.

4. The method according to claim 2, wherein the second period of time is at least 5 times as long as the first period of time.

5. The method according to claim 2, wherein the second period of time is at least 10 times as long as the first period of time.

6. The method according to claim 2, wherein the second period of time is at least 20 times as long as the first period of time.

7. The method according to claim 2, wherein the second period of time is at least 50 times as long as the first period of time.

8. The method according to claim 2, wherein the second period of time is at least 100 times as long as the first period of time.

9. The method according to claim 1, wherein the heat source comprises a laser.

10. The method according to claim 1, wherein the phase material comprises a paraffin.

11. The method according to claim 1, wherein the host material has a total porosity in the range from about 0.6 to about 0.75.

12. The method according to claim 1, wherein the host material has an open porosity in the range from about 0.8 to about 1.0

13. The method according to claim 1, wherein the host material has an average pore size in the range from about 300 microns to about 400 microns.

14. The method according to claim 1, wherein the host material filled with the phase change material has an effective thermal conductivity in the range from about 100 W/m-K to about 500 W/m-k.

15. The method according to claim 1, wherein the host material filled with phase change material has an effective thermal conductivity of at least 100 W/m-K.

16. The method according to claim 1, wherein the heat exchanger is an evaporative heat exchanger, wherein thermal energy transferred to the primary coolant from the heat source vaporizes at least a portion of the primary coolant.

17. The method according to claim 16, wherein the evaporative heat exchanger is a spray coolant heat exchanger.

18. The method according to claim 1, wherein the secondary coolant tubing comprises the primary coolant tubing.

19. The method according to claim 1, wherein the primary coolant tubing has a circular cross-sectional shape.

20. The method according to claim 1, wherein the primary coolant tubing has a rectangular cross-sectional shape.

21. The method according to claim 1, further comprising removing heat from the secondary coolant.

22. An apparatus for absorbing thermal energy from a heat source, comprising:
a primary coolant;
a heat exchanger, wherein thermal energy is absorbed from the heat source and transferred to the primary coolant via the heat exchanger;
a heat absorber, wherein the primary coolant is transported from the heat exchanger to the heat absorber, wherein thermal energy is transferred from the primary coolant to the heat absorber, wherein the heat absorber comprises a phase change material, wherein transfer of thermal energy from the primary coolant to the heat absorber melts at least a portion of the phase change material, wherein the heat absorber comprises a host material having voids that are filled with the phase change material such that the phase change material is in thermal contact with the host material, wherein the heat absorber comprises primary coolant tubing embedded in the heat absorber, wherein the primary coolant tubing is in thermal contact with at least a portion of the host material, wherein the primary coolant travels through the primary coolant tubing, wherein thermal energy is transferred from the primary coolant to the phase change material through the primary coolant tubing; and a secondary coolant, wherein thermal energy from the heat absorber is transferred to the secondary coolant, wherein the heat absorber comprises secondary coolant tubing embedded in the heat absorber, wherein the secondary coolant tubing is in thermal contact with at least a second portion of the host material, wherein the secondary coolant travels through the secondary coolant tubing, wherein thermal energy is transferred from the phase change material to the secondary coolant through the secondary coolant tubing.

23. The apparatus according to claim 22, wherein the evaporative heat exchanger is a spray coolant heat exchanger.

24. The apparatus according to claim 22, wherein thermal energy is absorbed from the heat source at a first rate of thermal energy transfer during a first period of time, wherein thermal energy is transferred from the heat absorber to the secondary coolant at a second rate of thermal energy transfer during a second period of time, wherein the first rate of thermal energy transfer is higher than the second rate of thermal energy transfer, and the first period of time is shorter than the second period of time.

25. The apparatus according to claim 24, wherein the second period of time is at least 2 times as long as the first period of time.

26. The method according to claim 24, wherein the second period of time is at least 5 times as long as the first period of time.

27. The method according to claim 24, wherein the second period of time is at least 10 times as long as the first period of time.

28. The method according to claim 24, wherein the second period of time is at least 20 times as long as the first period of time.

29. The method according to claim 24, wherein the second period of time is at least 50 times as long as the first period of time.

30. The method according to claim 24, wherein the second period of time is at least 100 times as long as the first period of time.

31. The apparatus according to claim 22, wherein the heat exchanger is an evaporative heat exchanger, wherein the thermal energy transferred to the primary coolant from the heat source vaporizes at least a portion of the primary coolant.

32. The apparatus according to claim 22, wherein the phase change material comprises a paraffin.

33. The apparatus according to claim 22, wherein the host material has a total porosity in the range from about 0.6 to about 0.75.

34. The apparatus according to claim 22, wherein the host material has an open porosity in the range from about 0.8 to about 1.0.

35. The apparatus according to claim 22, wherein the host material has an average pore size in the range from about 300 microns to about 400 microns.

36. The apparatus according to claim 22, wherein the host material filled with the phase change material has an effective thermal conductivity in the range from about 100 W/m-K to about 500 W/m-k.

37. The apparatus according to claim 22, wherein the secondary coolant tubing comprises the primary coolant tubing.

38. The apparatus according to claim 22, wherein the primary coolant tubing has a circular cross-sectional shape.

39. The apparatus according to claim 22, wherein the primary coolant tubing has a rectangular cross-sectional shape.

40. The apparatus according to claim 22, wherein the heat exchanger is an evaporative heat exchanger, wherein thermal energy transferred to the primary coolant from the heat source vaporizes at least a portion of the primary coolant.

* * * * *

UNITED STATES PATENT AND TRADEMARK OFFICE
CERTIFICATE OF CORRECTION

PATENT NO. : 7,316,262 B1
APPLICATION NO. : 11/043585
DATED : January 8, 2008
INVENTOR(S) : Daniel P. Rini and Louis Chow It is certified that error appears in the above-identified patent and that said Letters Patent is hereby corrected as shown below:

Title Page, Item (57), Abstract,
Lines 19-20, "host material has have voids" should read --host material has voids--.

Column 2,
Line 8, "host material has have voids" should read --host material has voids--.
Lines 29-30, "$\geq$ 100 kilowatts" should read --$\geq$ 100 kilowatts--.

Column 4,
Lines 54-55, "some other period of time" should read
  --some other selected period of time--.

Column 5,
Line 40, "$\epsilon_{eff} = \delta_{total} \cdot \epsilon_{open}$" should read
  --$\varepsilon_{eff} = \varepsilon_{total} \cdot \varepsilon_{open}$--.
Lines 47-48, "$k_{eff} = (1-\epsilon_{total}) \cdot k_{HM} + (\epsilon_{total} \cdot E_{open}) \cdot k_{PCM} + \epsilon_{total} \cdot (1-\epsilon_{open}) \cdot k_{gas}$"
  should read
  --$k_{eff} = (1-\varepsilon_{total}) \cdot k_{HM} + (\varepsilon_{total} \cdot \varepsilon_{open}) \cdot k_{PCM} + \varepsilon_{total} \cdot (1-\varepsilon_{open}) \cdot k_{gas}$--.

Column 6,
Lines 10-11, "with thermal conductivities in materials such as" should read
  --with thermal conductivities in this range include a variety of metals.
  Additional embodiments can incorporate host materials such as--.
Line 59, "organic paraffin's" should read --organic paraffins--.

Column 7,
Line 59, "due to is low melting point" should read --due to its low melting point--.

Column 9,
Lines 53-54, "can involve spraying via one or more spray nozzles a coolant"
  should read
  --can involve spraying, via one or more spray nozzles, a coolant--.
Line 58, "refrigerants like R-134*a* or R22" should read
  --refrigerants like R-134a or R22--.

UNITED STATES PATENT AND TRADEMARK OFFICE
CERTIFICATE OF CORRECTION

PATENT NO. : 7,316,262 B1
APPLICATION NO. : 11/043585
DATED : January 8, 2008
INVENTOR(S) : Daniel P. Rini and Louis Chow It is certified that error appears in the above-identified patent and that said Letters Patent is hereby corrected as shown below:

Column 10,
Line 59, "refrigerant such as R-22, R-134a, or ammonia" should read
--refrigerant such as R-22, R-134a, or ammonia--.

Signed and Sealed this

Second Day of June, 2009

JOHN DOLL
*Acting Director of the United States Patent and Trademark Office*